3,316,231
CRACKING OF HIGH MOLECULAR WEIGHT ETHYLENE POLYMERS AND RESULTING PRODUCTS

Peter J. Canterino and Major L. Gallaugher, Bartlesville, Okla., assignors to Phillips Petroleum Company, a corporation of Delaware
No Drawing. Filed Dec. 30, 1955, Ser. No. 556,471
3 Claims. (Cl. 260—93.7)

This invention relates to a novel hydrocarbon material and to a method of preparing same by thermally cracking aliphatic 1-olefin polymers of high molecular weight, high density and high crystallinity.

In accordance with the present invention it has been discovered that wax-like materials having a Shore D hardness in the range between 25 and 60, a melting point of at least 100° C., and an average molecular weight in the range between 900 and 3,000 (as determined by the boiling point method) can be produced by the controlled thermal cracking of high molecular weight, high density, high crystallinity aliphatic 1-olefin polymers. The controlled cracking process comprises heating the polymer in an inert atmosphere at atmospheric pressure or slightly reduced pressure at a temperature in the range between 600° and 900° F., for a period generally not to exceed 30 minutes. The products are excellent for use as polishing waxes, for coating and impregnation of paper and other materials, for making candles, and for electrical insulation. These products can be blended with other waxes such as low melting paraffin wax to increase the melting point of the latter.

Accordingly, it is an object of this invention to produce a novel hydrocarbon by the cracking of selected aliphatic 1-olefin polymers of high molecular weight, high density and high crystallinity.

A further object is to provide compositions of matter useful as waxes, coatings and the like.

Other objects, advantages and features of the invention should become apparent from the following detailed description of a present preferred embodiment of the invention.

The high molecular weight polymers which are cracked in accordance with this invention can be produced by processes disclosed in the copending application of Hogan and Banks, Ser. No. 476,306, filed Dec. 20, 1954 and now abandoned. Reference is made to this copending application for details of the process and the resulting polymers. In brief, this process comprises contacting a 1-olefin such as ethylene, propylene, and 1-butene, or a mixture of such aliphatic 1-olefins at a temperature in the range of 150° to 450° F. with a catalyst comprising as its essential ingredient, from 0.1 to 10 or more weight percent chromium in the form of chromium oxide, including a substantial proportion of hexavalent chromium associated with at least one additional oxide selected from the group consisting of silica, alumina, zirconia and thoria. This catalyst is often a highly oxidized catalyst which has been activated by high temperature treatment with an oxidizing gas. The polymerization normally is carried out with the monomeric olefin or olefins in solution in a hydrocarbon solvent, especially a paraffin or a naphthene which is liquid under the polymerization conditions. A pressure of at least 100 to 300 p.s.i. is generally required, and a pressure of around 500 p.s.i. is preferred. Other methods of producing polymers having the desired characteristics can also be employed.

The polymers which are decomposed by heating in accordance with the present invention have a molecular weight of at least 20,000, a density of at least 0.93, a crystallinity of at least 70%, preferably above 80%, and a melting point in excess of 100° C. The term "polymer" is used herein to designate both homopolymers and copolymers. The monomers employed to produce the polymers which are decomposed in accordance with the present invention are aliphatic 1-olefins having not more than four carbon atoms per molecule.

The controlled cracking process of this invention comprises heating such a polymer in an inert atmosphere, such as nitrogen, at atmospheric pressure or slightly reduced pressure, usually not below 600 mm. of mercury, and at an internal temperature of the polymer in the range between 600° and 900° F., preferably between 700° and 800° F. The polymer is heated rapidly until it is in the molten or liquid state. In some instances a product of the desired molecular weight, hardness, and melting point, as hereinbefore specified, can be obtained by heating the polymer until it is all in the molten state and then removing the source of heat. In other cases the molten mass is stirred and heating is continued for a period which generally does not exceed 30 minutes. The time of heating is governed by the temperature employed and properties of the product desired.

The controlled cracking of the polymers can be operated as a batch or continuous process. When the latter method is employed, a long tubular cracking zone can be provided with a suitable heating means. The polymer is introduced at one end of the cracking zone and an outlet is provided at the opposite end for extrusion of the product. The temperature and residence time control the type of product obtained. The longer the heat is applied and the higher the temperature, the lower is the molecular weight of the product.

The products obtained by controlled thermal cracking of high molecular weight, high density, highly crystalline, polymers have numerous uses. One valuable application is in coating and impregnating paper to make containers for both hot and cold liquids. The high melting points of these products makes them particularly valuable for use in the fabrication of paper cups which can be used for serving hot beverages. Low melting waxes, e.g., paraffin wax, which are limited in their use, can be improved by the incorporation of variable amounts of the high melting point cracked polymers of this invention. It has been found that a paraffin wax having a melting point of around 50° C., when blended with a cracked ethylene polymer having a melting point of 110–115° C., will give a product having a melting point above 100° C. when only 20 parts by weight of the cracked ethylene polymer is used per 80 parts of the paraffin wax.

As hereinbefore mentioned, the cracked products of this invention are excellent for use as polishing waxes. In making up wax compositions for this purpose, a hydrocarbon solvent can be added to the wax to give a composition of the desired consistency. Solvents which are applicable include both aromatic and aliphatic hydrocarbons or mixtures, and any other solvents which have been found useful in the preparation of compositions from other types of waxes may be employed. Examples of suitable solvents include kerosene, turpentine, diisopropylbenzene, and the like.

EXAMPLE I

Ethylene was polymerized in a continuous process using a reactor provided with a stirrer. Polymerization was effected in the presence of a chromium oxide-silica-alumina catalyst (2.5 weight percent chromium as chromium oxide) using isooctane as the solvent. Polymer concentration in the reactor was 5.5 weight percent, catalyst concentration was 0.35 weight percent, and the residence time was 1.7 hours. The reaction was effected at a temperature of 265° F. and a pressure of 420 p.s.i.g. The product had the following properties:

| | |
|---|---|
| Molecular weight [1] | 48,100 |
| Density | 0.96 |
| Melting point, °C. | 119 |
| Ash, weight percent | 0.52 |
| Volatiles, weight percent | 0.08 |
| Melt index [2] | 0.29 |
| Crystallinity, percent [3] | above 90 |

[1] Determined by Staudinger equation: mol. wt.=2.445×inherent viscosity×10$^4$. This is the method of Kemp and Peters, Ind. Eng. Chem., 35, 1108 (1943) and Dienes and Klemm, J. Applied Phy., 17, 458 (June 1946).
[2] Tentative method for measuring flow of thermoplastics by extrusion plastometer, ASTM D1238-52T.
[3] A relative value determined by infrared measurement using a 36-carbon atom hydrocarbon as a standard.

One hundred grams of the ethylene polymer was charged to a one-liter flask provided with a stirrer and a gas inlet tube. The flask was purged with nitrogen and the polymer was heated under a nitrogen blanket at slightly reduced pressure (approximately 700 mm. Hg). The polymer was heated rapidly with a Fisher burner until the internal temperature was approximately 700° F. (371° C.) and the polymer was in the molten state. Heating was continued at this temperature while the material was stirred. The total heating time was 30 minutes. The cracked product, which was a wax-like material, had the following physical properties:

| | |
|---|---|
| Molecular weight [1] | 2909 |
| Melting point, °C. | 113 |
| Shore D hardness | 45 |

[1] Determined by Staudinger equation described above.

The cracked ethylene polymer and carnauba wax were employed in making up separate formulations for testing as polishing waxes by using equal parts by weight of the cracked polymer and carnauba wax and diisopropylbenzene. The materials were blended and each composition was applied to (1) a walnut test panel previously rubbed with linseed oil and (2) a soft pine test panel treated with a water stain, dried, and rubbed with linseed oil. After application of the wax composition, each panel was allowed to dry approximately 30 minutes and was polished with a soft cloth. Both panels were treated in as nearly the same manner as possible. Gloss was read with a Photovolt Glossmeter to get 60 degree specular reflectance. Readings were taken (a) with the grain and (b) across the grain. Readings were also taken on panels to which no wax composition had been applied. Results were as follows:

| | 60° Specular Reflectance | | | |
|---|---|---|---|---|
| | Walnut | | Pine | |
| Formulation from— | With Grain | Across Grain | With Grain | Across Grain |
| Cracked ethylene polymer | 30 | 20 | 40 | 23 |
| Carnauba wax | 16 | 11 | 34 | 14 |
| Control (no wax) | 2 | 2 | 5 | 5 |

EXAMPLE II

Ethylene was polymerized in a continuous process using a reactor provided with a stirrer. Polymerization was effected in the presence of a chromium oxide-silica-alumina catalyst (2.5 weight percent chromium as chromium oxide) using cyclohexane as the solvent. Polymer concentration in the reactor was 8 weight percent, catalyst concentration was 0.50 weight percent, and the residence time was 3 hours. The reaction was effected at a temperature of 280° F. and a pressure of 420 p.s.i.g. Physical properties of the product were as follows:

| | |
|---|---|
| Molecular weight [1] | 37,600 |
| Melt index [1] | 1.37 |
| Volatiles, weight percent | 0.02 |
| Ash, weight percent | 0.001 |
| Crystallinity, percent [1] | Above 90 |

[1] As in Example I.

The ethylene polymer was heated rapidly to 700° F. in the manner described in Example I. After it had been converted to the liquid state, it was stirred and held at a temperature of 700–710° F. for 2 minutes. Two runs were made and the wax-like products had the following properties:

| | Run 1 | Run 2 |
|---|---|---|
| Molecular weight [1] | 1,900 | 1,480 |
| Melting point, °C | 115 | 115 |
| Shore D Hardness | 50–55 | 50–55 |

[1] Boiling point method using tetrachloroethylene as the solvent.

Products from the two runs were blended and the blend was employed in making up a formulation for testing as a polishing wax. Carnauba wax and Alcowax (a commercial low molecular weight polyethylene having a Shore D hardness of 30 and a melting point of 96° C.) were employed in addition to the cracked ethylene polymer blend.

| Wax Material | Wax, grams | Kerosene, cc. | Turpentine, cc. |
|---|---|---|---|
| Cracked ethylene polymer blend | 15 | 10 | 40 |
| Carnauba wax | 10 | 6 | 30 |
| Alcowax | 15 | 10 | 40 |

The compositions, which were of paste or grease-like consistency, were applied to black vinyl tile with cheesecloth and allowed to dry 20 minutes. The Gardner Washability and Abrasion Testing Machine, Model 105, was used for polishing employing the abrasion boat with a special weight (4.5 pounds total weight). Four layers of cheesecloth were applied to the abrasion boat.

The polishing procedure was the same in each case. The first 100 strokes of the machine was for the purpose of removing excess wax. The cheesecloth was replaced with new material at the end of each 1000 strokes thereafter. Gloss was determined at the end of each 1000 strokes with a Photovolt Glossmeter by measuring 60 degree specular reflectance. Results were as follows:

| | Strokes | | | | |
|---|---|---|---|---|---|
| Formulation from— | 1,000 | 2,000 | 3,000 | 4,000 | 5,000 |
| Cracked ethylene polymer blend | 73 | 72 | 67 | 64 | 64 |
| Carnauba wax | 71 | 70 | 61 | 67 | 65 |
| Alcowax | 64 | 59 | 59 | 61 | 57 |

EXAMPLE III

Blends of paraffin wax with the cracked ethylene polymer described in Example I and also with carnauba wax were prepared and melting points were determined. Results were as follows:

| | Melting point, °C. |
|---|---|
| 50/50 cracked ethylene polymer/paraffin wax | 110.5 |
| 20/80 cracked ethylene polymer/paraffin wax | 101–105 |
| 100 cracked ethylene polymer | 113 |
| 100 paraffin wax | 48–51 |
| 50/50 carnauba wax/paraffin wax | 66 |
| 100 carnauba wax | 79 |

EXAMPLE IV

Propylene was polymerized to provide the material to be pyrolyzed. The catalyst was prepared by dissolving 5 ml. of triethylaluminum and 2 ml. of titanium tetrachloride in two liters of cyclohexane. This catalyst was placed in a reactor which was flushed with nitrogen. Propylene was then supplied continuously to the reactor for five hours and ten minutes. The temperature varied between 104° F. and 162° F. The pressure varied from 30 to 140 p.s.i.g. The resulting polymer was washed several times with isopropyl alcohol, then once with methyl alcohol, and was dried in a vacuum oven for 24 hours. The polymer was mixed with material obtained from two similar runs and was boiled in normal heptane to remove the soluble fraction. The liquid was siphoned off and the operation repeated four times. Approximately 153 grams of insoluble polymer was obtained from 993 grams so treated. This product was mixed with material produced from several similar runs. The resulting mixture had a crystallinity of 83% as determined by nuclear resonance measurements.

Ten grams of the final polymer mixture was placed in a 25 ml. Claisen flask fitted with a thermowell and thermocouple. Heat was supplied by a gas burner to raise the temperature of the polymer to 700° F. Nitrogen was passed through the flask to maintain an inert atmosphere. The heating time was four minutes. The properties of the resulting product were as follows:

| Hardness, (Shore D) | Melting Range (° C.) | Molecular Wt., (boiling point method) |
|---|---|---|
| 59–55 | 112–116 | 2,355 |

EXAMPLE V

A copolymer of ethylene and propylene was prepared for use as the starting material. The catalyst was prepared by impregnating 20 to 30 mesh silica alumina with 0.76 molar chromium trioxide solution and heating in dry air for six hours at 950° F. Analysis of the catalyst showed 2.5 weight percent total chromium and 2.2 weight percent hexavalent chromium. The polymerization was carried out in a stirred reactor. The catalyst was dissolved in cyclohexane and was at a concentration of about 0.6 percent of solvent weight. The reaction was effected at a pressure of 450 p.s.i.g. and at a temperature of 250° F. The monomer feed supplied to the reactor comprised 7 weight percent propylene and 93 weight percent ethylene. The duration of the reaction was approximately 5 hours. The product had the following properties:

Density _____ 0.934
Melt index _____ 0.240
Softening temperature ° F. _____ 248
Crystallinity [1] percent _____ 75

[1] By infrared measurements.

A ten gram sample of the product was heated under the identical conditions of Example IV. The resulting material had the following properties:

| Hardness (Shore D) | Melting Range (° C) | Molecular Weight, (boiling point method) |
|---|---|---|
| 25 | 101–104 | 930 |

The foregoing examples show that excellent waxes are obtained by the process of this invention. The melting points of the products are nearly as high as the melting points of the original ethylene polymers, even though the molecular weights are only a fraction of the molecular weights of the original polymers. Small amounts of the products of this invention, when blended with conventional waxes, serve to raise the melting points of the latter considerably. This is a valuable property in obtaining waxes and coating materials.

While the invention has been described in conjunction with present preferred embodiments, it obviously is not limited thereto.

What is claimed is:

1. A process which comprises thermally decomposing a crystalline polypropylene by heating said polypropylene to a temperature in the range of 600 to 900° F. for a period less than 30 minutes, in an inert atmosphere at a pressure not greater than atmospheric pressure and recovering the product of said thermal decomposition.

2. The method of making a synthetic wax having low melt viscosity in combination with high hardness and high softening point which comprises heating, at a temperature of 315 to 450° C., crystalline polypropylene having an average molecular weight of at least 20,000, until the molecular weight is reduced to a value within the range of 1,000 to 3,000.

3. A process which comprises thermally decomposing a polymer of polypropylene, said polymer having a crystallinity greater than 70 percent and a density of at least 0.93, said decomposition being effected by heating such a polymer to a temperature in the range of 600 to 900° F. for a period less than 30 minutes, in an inert atmosphere at a pressure not greater than atmospheric pressure and recovering the product of said thermal decomposition.

References Cited by the Examiner
UNITED STATES PATENTS

| | | | |
|---|---|---|---|
| 2,367,173 | 1/1945 | Martin | 260—94.9 |
| 2,372,001 | 3/1945 | Joyce | 260—94.8 |
| 2,436,069 | 2/1948 | Joyce | 260—653 |
| 2,480,615 | 8/1949 | Strain et al. | 260—94.9 |
| 2,692,258 | 10/1954 | Roebuck et al. | 260—94.9 |
| 2,706,719 | 4/1955 | Newberg et al. | 260—94.9 |
| 2,726,231 | 12/1955 | Field et al. | 106—270 |
| 2,758,100 | 8/1956 | Bailly et al. | 106—270 |
| 2,835,659 | 5/1958 | Guillet | 260—93.7 |
| 2,882,246 | 4/1959 | Leatherman et al. | 260—94.9 |

FOREIGN PATENTS 569,043   5/1945   Great Britain.

OTHER REFERENCES

Richards, B: "Polyethylene-Structure—Crystallinity and Properties," J. Appl. Chem., August 1951, pp. 370–376.

Natta: La Chimica e l'Industria, vol. 37, pp. 888–903, October 1955, p. 890 needed.

Kresser: Polypropylene, Reinhold Pub. Co., 1960, pp. 9–16.

Natta and Corradine: "The Crystalline Structure of a New Type of Polypropylene," Atti Dell "Accademia Nazionale Dei Liricei, (CCCLII–1955) series VIII, vol. IV, section II, No. 5.

JOSEPH L. SCHOFER, *Primary Examiner.*

N. LIEBMAN, B. E. LANHAM, A. M. BOETTCHER, J. R. SPECK, L. H. GASTON, *Examiners.*

A. LIEBERMAN, F. L. DENSON, M. AXELRAD, *Assistant Examiners.*